United States Patent
Shibuya et al.

(10) Patent No.: US 8,915,974 B2
(45) Date of Patent: Dec. 23, 2014

(54) METHOD FOR MANUFACTURING CAPACITOR ELEMENT

(75) Inventors: Yoshinori Shibuya, Tokyo (JP); Akihiko Shirakawa, Tokyo (JP); Masahiro Suzuki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 343 days.

(21) Appl. No.: 13/126,553

(22) PCT Filed: Oct. 29, 2009

(86) PCT No.: PCT/JP2009/068601
§ 371 (c)(1),
(2), (4) Date: Jun. 10, 2011

(87) PCT Pub. No.: WO2010/050558
PCT Pub. Date: May 6, 2010

(65) Prior Publication Data
US 2011/0239424 A1 Oct. 6, 2011

(30) Foreign Application Priority Data
Oct. 29, 2008 (JP) ................................. 2008-277840

(51) Int. Cl.
*H01G 9/00* (2006.01)
*H01G 9/07* (2006.01)
*H01G 9/15* (2006.01)

(52) U.S. Cl.
CPC ............ *H01G 9/0032* (2013.01); *H01G 9/07* (2013.01); *H01G 9/15* (2013.01)
USPC ...................................................... 29/25.03

(58) Field of Classification Search
None
See application file for complete search history.

(56) References Cited

U.S. PATENT DOCUMENTS

| 6,788,523 | B1 | 9/2004 | Hossick-Schott et al. |
| 2003/0104923 | A1* | 6/2003 | Omori et al. ............... 501/134 |
| 2004/0240151 | A1 | 12/2004 | Hossick-Schott et al. |
| 2006/0091020 | A1 | 5/2006 | Hossick-Schott et al. |
| 2007/0025063 | A1 | 2/2007 | Viste et al. |
| 2008/0232029 | A1 | 9/2008 | Ning |
| 2008/0232030 | A1* | 9/2008 | Jones et al. ............... 361/503 |
| 2009/0269901 | A1 | 10/2009 | Naito |
| 2010/0289458 | A1 | 11/2010 | Viste et al. |

FOREIGN PATENT DOCUMENTS

| JP | 9-306791 A | 11/1997 |
| JP | 2008-519440 A | 6/2008 |
| JP | 2008-235895 A | 10/2008 |
| WO | 2007/061034 A1 | 5/2007 |

* cited by examiner

*Primary Examiner* — Seahvosh Nikmanesh
(74) *Attorney, Agent, or Firm* — Sughrue Mion, PLLC

(57) ABSTRACT

A capacitor element is obtained by chemically converting an anode body comprising a niobium or niobium alloy in an electrolyte solution, which is obtained by dissolving an oxygen supply agent such as hydrogen peroxide, a freezing point depressant such as ethylene glycol, and an electrolyte such as phosphoric acid in water, at a solution temperature lower than the freezing point of a solution having the composition of the electrolyte solution excluding the freezing point depressant, for forming a dielectric layer in the surface of the anode body or repairing a dielectric layer formed in the surface of the anode body. An electrolytic capacitor is obtained by forming a cathode on the dielectric layer of the capacitor element, electrically connecting the anode body and the cathode respectively to external terminals, and then sealing them.

13 Claims, 9 Drawing Sheets

METHOD FOR MANUFACTURING CAPACITOR ELEMENT

CROSS REFERENCE TO RELATED APPLICATIONS

This application is a National Stage of International Application No. PCT/JP2009/068601 filed Oct. 29, 2009, claiming priority based on Japanese Patent Application No. 2008-277840, filed Oct. 29, 2008, the contents of all of which are incorporated herein by reference in their entirety.

TECHNICAL FIELD

The present invention relates to a method for manufacturing a capacitor element. More specifically, the invention relates to a method for manufacturing a capacitor element having a niobium-base anode body that enables chemical conversion at a high voltage and suppresses a change in leakage current through a heat history, such as reflow, to be small.

BACKGROUND ART

In anode bodies of commercially available electrolytic capacitors, tantalum or aluminum is widely used. In the surface of such an anode body, a coating film (chemical conversion coating film) composed of an oxide of the anode material is formed by anodization (chemical conversion treatment). The chemical conversion coating film serves as the dielectric layer of the electrolytic capacitor. Since the performance characteristics of aluminum electrolytic capacitors highly differ from those of tantalum electrolytic capacitors, they are applied to different respective uses.

In the meantime, niobium metals are known to have physical and chemical properties similar to those of tantalum metals. Niobium is abundant as a mineral resource compared to tantalum and is inexpensive. In addition, niobium pentoxide has a high dielectric constant compared to other metal oxides. Accordingly, niobium has been studied to replace tantalum used in tantalum electrolytic capacitors.

However, a niobium oxide coating film obtained by chemically converting a niobium anode body is unstable compared to a tantalum oxide coating film. In particular, the thickness of a niobium oxide coating film per formation voltage is twice that of a tantalum oxide coating film, and the strain occurring with the growth of a niobium oxide coating film is also twice that of a tantalum oxide coating film. Therefore, the breakdown voltage per unit thickness of the niobium oxide coating film is half that of the tantalum oxide coating film.

Furthermore, niobium oxide contains a nonstoichiometric lower oxide, which is not present in tantalum oxide. It is thought that this encourage diffusion of oxygen in a dielectric layer, imparts semiconducting properties to the dielectric layer, and increases leakage current.

Thus, the niobium oxide coating film has unstable characteristics. However, the niobium electrolytic capacitors have a possibility of showing characteristics superior to those of the tantalum electrolytic capacitors. Accordingly, many studies have been further conducted.

For example, Patent Document 1 describes a method for manufacturing a niobium electrolytic capacitor by chemically converting a niobium sintered body or niobium foil in an electrolyte aqueous solution containing chlorine ions at a solution temperature of −15° C. to 100° C. and subsequently performing aging in an electrolytic solution substantially not containing halogen ions. This electrolyte aqueous solution is prepared by dissolving a chloride based electrolyte, such as hydrogen chloride, a metal chloride, or a chloride of ammonium or amine, in water.

Patent Document 2 describes manufacturing an electrolytic capacitor anode by sintering flaked niobium powder in vacuum and anodizing the sintered body in an 0.1 wt % aqueous solution of phosphoric acid. The temperature of the phosphoric acid aqueous solution during the anodization is not specifically disclosed in Patent Document 2, but it is supposed that the temperature is a level at which conventional chemical conversion is performed by a person skilled in the art, that is, about 60° C. to 90° C.

Patent Document 3 proposes a process for chemical conversion by immersing a niobium anode body in an aqueous solution (chemical conversion solution) containing at least one acid selected from phosphoric acid, nitric acid, and sulfuric acid and performing chemical conversion at a solution temperature of not lower than the freezing point and not higher than about 40° C. It is disclosed that the freezing point of the chemical conversion solution slightly varies depending on the kind and the concentration of the solute, but is about 0° C. (or a temperature slightly lower than about 0° C.). In the examples of Patent Document 3, the solution temperature during chemical conversion is set at 5° C. to 40° C.

Patent Document 4 describes a method for manufacturing a solid electrolytic capacitor in which an oxide coating film is formed in a surface of a porous sintered body of tantalum, which is a metal exhibiting valve action, by immersing the sintered body in an aqueous solution containing hydrogen peroxide and phosphoric acid to anodize the sintered body. The chemical conversion solution temperature during the anodization is not specifically disclosed in Patent Document 4, but it is supposed that the temperature is a level at which conventional chemical conversion is performed by a person skilled in the art, that is, about 60° C. to 90° C.

Patent Document 5 discloses a method for manufacturing an electrolytic capacitor in which a dielectric coating film layer is formed in the surface of a niobium or niobium-based alloy anode body, and then a first conductive polymer layer of polypyrrole or a polypyrrole derivative is formed on the dielectric coating film layer by immersing the anode body provided with the dielectric coating film layer in a solution comprising 0.7 to 10 wt % of hydrogen peroxide and 0.3 to 3 wt % of sulfuric acid and water as a main solvent, pulling up the anode body and exposing it to vapor of pyrrole or a pyrrole derivative. The dielectric coating film layer is formed by sintering niobium powder to a porous anode element and immersing the porous anode element in an aqueous solution of phosphoric acid at 5° C. for chemical conversion treatment at a voltage of 38 V.

Patent Document 6 describes a method for manufacturing an anode for an electrolytic capacitor by immersing a metal exhibiting valve action in an electrolytic solution to anodize the metal at 40° C. It is shown that when tantalum powder is used as the metal exhibiting valve action, the electrolytic solution composed of ethylene glycol or polyethylene glycol, deionized water, and phosphoric acid is used.

Patent Document 7 discloses an anodization electrolytic solution for forming a dielectric oxide on a metal exhibiting valve action. The anodization electrolytic solution contains water; oxo acid of phosphorus or its salt; at least one selected from the group consisting of inorganic acids, salts of inorganic acids, carboxylic acid, carboxylates and mixtures thereof; and a protic solvent. As examples of the protic solvent when the metal exhibiting valve action is tantalum, alkylene glycol and polyalkylene glycol are disclosed. The chemical conversion solution temperature during the anodization is not specifically disclosed, but it is supposed that the temperature is a level at which conventional chemical conversion is performed by a person skilled in the art, that is, about 60° C. to 90° C.

CITATION LIST

Patent Literature

Patent Document 1: JP S57-113211 A
Patent Document 2: JP 2002-507247 A
Patent Document 3: JP 2002-198266 A
Patent Document 4: JP H09-246109 A
Patent Document 5: JP 2003-59763 A
Patent Document 6: JP 2000-133557 A
Patent Document 7: JP 2007-224421 A

SUMMARY OF THE INVENTION

Problems to be Solved by the Invention

However, in the conventional anodization described above, the upper threshold of the formation voltage for niobium is about 40 V to 50 V. Since the strain in niobium dielectric coating film caused by chemical conversion treatment is still high, in an electrolytic capacitor having the niobium-base anode body, the change in leakage current through a heat history, such as reflow, cannot be sufficiently reduced.

It is an object of the present invention to provide a method for manufacturing a capacitor element or electrolytic capacitor having a niobium-base anode body, wherein chemical conversion at a high voltage is possible, and the change in leakage current through a heat history, such as reflow, is small.

Means for Solving the Problems

The present inventors have conducted intensive studies in order to achieve the above-mentioned object and, as a result, have found that thermal diffusion of oxygen and crystallization in a niobium oxide are inhibited to enable chemical conversion at a high capacity and a high voltage, which is impossible at an ordinary temperature, by chemically converting an anode body composed of niobium or niobium alloy in an electrolytic solution containing an oxygen supply agent, a freezing point depressant, an electrolyte and a solvent at a solution temperature lower than the freezing point of a solution being the same as the electrolyte solution except that the freezing point depressant is not comprised, and thereby forming a dielectric layer in the surface of the anode body or repairing a dielectric layer formed in the surface of the anode body, and that a capacitor element or an electrolytic capacitor including the niobium-base anode body, in which the change in leakage current is small, can be obtained. The present invention has been completed by further research based on this finding.

That is, the present invention includes the following aspects.
(1) A method for manufacturing a capacitor element comprising:
chemically converting an anode body composed of a niobium or niobium alloy in an electrolyte solution comprising an oxygen supply agent, a freezing point depressant, an electrolyte and a solvent at a solution temperature lower than the freezing point of a solution being the same as the electrolyte solution except that the freezing point depressant is not comprised to form a dielectric layer in a surface of the anode body or to repair a dielectric layer formed in a surface of the anode body.
(2) A method for manufacturing a capacitor element comprising:
chemically converting an anode body composed of a niobium or niobium alloy to form a dielectric layer in a surface of the anode body,
forming a semiconductor layer on the dielectric layer;
conducting a chemical conversion during or after the formation of the semiconductor layer in an electrolyte solution comprising an oxygen supply agent, a freezing point depressant, an electrolyte, and a solvent at a solution temperature lower than the freezing point of a solution being the same as the electrolyte solution except that the freezing point depressant is not comprised to repair the dielectric layer.
(3) The method for manufacturing a capacitor element according to the aspect (1) or (2), wherein the oxygen supply agent is hydrogen peroxide or ozone.
(4) The method for manufacturing a capacitor element according to any one of the aspects (1) to (3), wherein the freezing point depressant is alcohol.
(5) The method for manufacturing a capacitor element according to the aspect (4), wherein the alcohol is at least one compound selected from the group consisting of methanol, ethanol, ethylene glycol, glycerin, 1-propanol, 2-propanol, and butanol.
(6) The method for manufacturing a capacitor element according to any one of the aspects (1) to (5), wherein the electrolyte is phosphoric acid, sulfuric acid, nitric acid, boric acid, acetic acid, adipic acid, or a salt of any of these acids, and wherein the solvent is water.
(7) The method for manufacturing a capacitor element according to any one of the aspects (1) to (6), wherein the electrolyte solution is not a supersaturated solution during the chemical conversion.
(8) The method for manufacturing a capacitor element according to any one of the aspects (1) to (7), wherein the anode body is a sintered body or foil.
(9) The method for manufacturing a capacitor element according to any one of the aspects (1) to (8), wherein the anode body is a porous material.
(10) The method for manufacturing a capacitor element according to any one of the aspects (1) to (9), wherein the formation voltage is 210 V or higher, and the CV value of the anode body is 40000 CV/g or less.
(11) The method for manufacturing a capacitor element according to any one of the aspects (1) to (9), wherein the formation voltage is $294 \times \exp(-8.4 \times 10^{-6} \times CV$ value $[\mu FV/g]$ of the anode body) [V] or higher, and the CV value of the anode body is larger than 40000 CV/g.
(12) The method for manufacturing a capacitor element according to any one of the aspects (1) to (11), wherein the current value at the end point of chemical conversion is 1/20 or less of the initial current value in constant-voltage chemical conversion.
(13) A capacitor element produced by the method according to any one of the aspects (1) to (12).
(14) A method for manufacturing an electrolytic capacitor comprising: preparing a capacitor element having a dielectric layer produced by the method according to any one of the aspects (1) to (12), forming a cathode on the dielectric layer of the capacitor element, electrically connecting the anode body and the cathode respectively to external terminals, and sealing them.
(15) An electrolytic capacitor comprising: the capacitor element according to the aspect (13), and a cathode on the dielectric layer of the capacitor element, wherein the anode body and the cathode are electrically connected respectively to external terminals and are sealed.

Advantageous Effects of the Invention

According to the manufacture method of the present invention, oxygen in a dielectric coating film is prevented from diffusing, which allows the dielectric coating film not to have positive holes and defects even at a high formation voltage, and a capacitor element or an electrolytic capacitor comprising a niobium-base anode body having a small change in leakage current before and after high-temperature treatment can be obtained.

EMBODIMENTS FOR CARRYING OUT THE INVENTION

Figure 1:
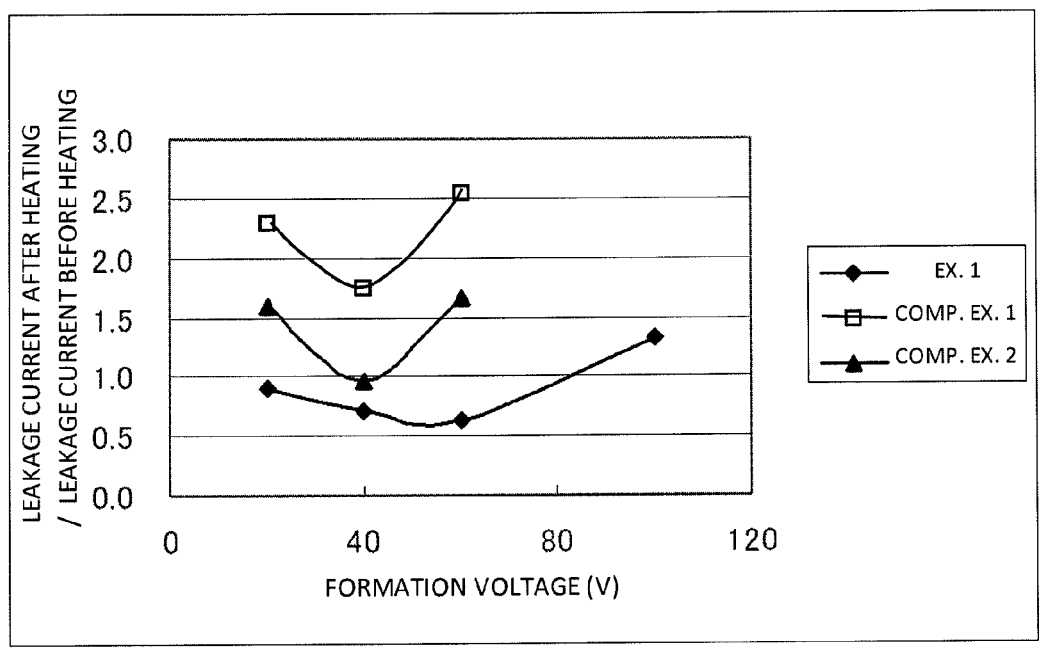
FIG. 1 is a graph showing changes in leakage current before and after heating of a capacitor element obtained by the manufacture method in the present invention and a capacitor element obtained by a conventional process.

The method for manufacturing a capacitor element of the present invention comprises the steps of chemically converting an anode body composed of a niobium or niobium alloy in an electrolyte solution comprising an oxygen supply agent, a freezing point depressant, an electrolyte and a solvent at a solution temperature lower than the freezing point of a solution being the same as the electrolyte solution except that the freezing point depressant is not comprised to form a dielectric layer in a surface of the anode body or to repair a dielectric layer formed in a surface of the anode body.

The anode body composed of a niobium or niobium alloy used in the present invention is not particularly limited, and those usually obtained can be used. Examples of niobium used in the anode body include alkali metal reduced products of niobium halide, alkaline earth metal reduced products of niobium oxide, and pulverized/dehydrogenated products of niobium hydride. In addition, the anode body may be made of an alloy having a parent metal of niobium "niobium alloy", for example, as in WO2002/015208.

The anode body may be in any form, such as a foil, line, sintered body, sputtered film, or deposited film. Among them, the sintered body or foil is preferred. An anode body in a foil form is suitable for a winding-type capacitor.

When a sintered body of niobium or niobium alloy powder is used as an anode body, it is preferable to control the particle shape of the powder. For example, if the conversion constant of niobium is 4 nm/V, chemical conversion coating films grow so that the sum of thickness of the front and back coating films is 0.4 μm by chemical conversion at 50 V. After considering the transport number of the element, about 0.15 μm of the dielectric coating film infiltrates into the anode body on each of the front and back sides. If the dielectric material replaces the sintered particles to near the center, the conductive portion disappears, resulting in a decrease in capacitance.

The binding state between particles in a sintered body highly affects electrolytic formation. The fusion between powders in a sintered body progresses to enlarge the binding portion thereof with an increase in compression force for molding the powder or in apparent green density or with an increase in sintering temperature of the powder or in time for sintering. The enlargement of binding portion allows the anode body to withstand the formation and growth of the dielectric coating film and to withstand chemical conversion at a higher voltage. On the other hand, there is a tendency to decrease the specific surface area of the anode body and to reduce the electric capacitance. In addition, if a chemical conversion coating film grows at a curved surface, strain easily occurs due to the curvature difference between the outer circumference and the inner circumference, which may cause breakage of the dielectric coating film.

Therefore, when the anode body to be used is a porous material such as a sintered body, the threshold of formation voltage (threshold formation voltage) is necessarily determined by the CV value of the anode body. CV value is the product of electric capacitance per unit mass of the anode body and formation voltage, expressed by the unit "μFV/g". The threshold formation voltage is approximately constant when the CV value is not higher than about 40000 μFV/g, but the threshold formation voltage decreases with an increase in CV value in the range higher than 40000 μFV/g. For example, in an anode body of a 100000 μFV/g class, the threshold formation voltage is about 120 V, and in an anode body of a 200000 μFV/g class, the threshold formation voltage is about 50 V.

The anode body used in the present invention has low strain due to a difference in curvature of particles constituting the sintered body, for example, as in sintered bodies of a 40000 μFV/g class and, therefore, is not limited intrinsically to the sintered bodies advantageous for chemical conversion at high voltage. In 20-V chemical conversion using a 1% phosphoric acid solution for a so-called S case size, an element having a capacitance of about 150 μF, on other words, a sintered body of a 150000 μFV/g class can be used. Furthermore, capacitors having larger capacitance and higher voltage resistance can be designed with sintered bodies obtained by suitably molding and sintering powder having higher capacitance.

The electrolyte solution used in the present invention is a solution comprising an oxygen supply agent, a freezing point depressant, an electrolyte, and a solvent.

The electrolyte is one conventionally commonly used in anodization (chemical conversion). The electrolyte preferably hardly causes chemical reaction with the oxygen supply agent or the freezing point depressant, and examples thereof include phosphoric acid, sulfuric acid, nitric acid, boric acid, oxalic acid, acetic acid, adipic acid, and their salts. Among them, phosphoric acid, sulfuric acid, nitric acid, boric acid, acetic acid, adipic acid, and their salts are preferred, and phosphoric acid is particularly preferred. The amount of the electrolyte is preferably 0.01 to 10% by mass, more preferably 0.1 to 5% by mass, based on the total mass of the electrolyte solution.

The oxygen supply agent is not particularly limited as long as it can compensate for oxygen consumed by anodization, and examples thereof include hydrogen peroxide and ozone. The hydrogen peroxide or ozone is preferably dissolved in a solvent and is added to the electrolyte solution. The amount of the oxygen supply agent is preferably 0.01 to 5% by mass, more preferably 0.1 to 3% by mass, based on the total mass of the electrolyte solution.

The solvent is usually water. For instance, a solution using water as the solvent and being the same as the electrolyte solution except that the freezing point depressant is not comprised has a freezing point of approximately 0° C.

The freezing point depressant is not particularly limited as long as it can lower the freezing point of a solution by adding the freezing point depressant to the solution, but is preferably that having high compatibility with the solvent. For example, when the solvent is water, the freezing point depressant is preferably alcohol, particularly preferably, methanol, ethanol, ethylene glycol, glycerin, 1-propanol, 2-propanol, or butanol. Note that the electrolyte itself has an effect of lowering a freezing point, but is not included in the freezing point depressant in the present invention.

Since the freezing point depressant is electrically resistive to the electrolyte solution, the amount thereof is most preferably the minimum amount so that the electrolyte solution does not freeze at the desired formation temperature. The amount of the freezing point depressant is preferably 5 to 40% by mass, more preferably 10 to 30% by mass, based on the total mass of the electrolyte solution.

In the method for manufacturing a capacitor element of the present invention, an anode body is chemically converted by electrolytic oxidation at a solution temperature lower than the freezing point of a solution having the composition in which the freezing point depressant is excluded from the electrolyte solution comprising the oxygen supply agent, the freezing-point depressant, the electrolyte and the solvent, and is preferably from not lower than −30° C. and lower than the above-mentioned freezing point, more preferably from −20° C. to −2° C., and specifically preferably from −13° C. to −7° C. At such a temperature, a satisfactory dielectric layer can be formed in the surface of the anode body, or the dielectric layer formed in the surface of the anode body can be repaired to a satisfactory one.

When the solution temperature during chemical conversion is higher than the freezing point of a solution being the same as the electrolyte solution except that the freezing point depressant is not comprised, a crystal is formed in the dielectric coating film, and this crystal serves as a starting point of damage in the chemical conversion coating film and is therefore disadvantageous for chemical conversion at high voltage. The oxygen diffusion in the dielectric coating film becomes brisk with an increase in temperature to make the thickness of the dielectric layer large, resulting in a decrease in electric capacitance.

On the other hand, when the solution temperature is set at a temperature not higher than −30° C., a high threshold formation voltage is obtained. However, the necessary amount of the freezing point depressant increases to raise the electric resistance of the electrolyte solution. Since an electrolyte solution with high electric resistance becomes a heat generator by itself, a large cooling system is necessary.

As long as desired formation voltage is sufficiently obtained, a solution temperature of −13° C. to −7° C. suppresses the resistance of the electrolyte solution to be low and allows the applied power to be efficiently used for electrolytic formation and is therefore a well-balanced treatment condition.

The electrolyte solution during the chemical conversion is preferably not supersaturated with a solute. A supersaturated state is shifted to a phase equilibrium state by some trigger (e.g., shock and the like), and precipitation of crystals may occur to disadvantageously affect chemical conversion at high voltage.

The current density at the onset of the chemical conversion is preferably 1 $\mu A/cm^2$ to 10 $mA/cm^2$ per surface area of the capacitor element. For example, when the anode body is a sintered body of 150000 CV/g, the current density is preferably 3 mA/g to 30 A/g per mass of the capacitor element. The formation voltage is preferably adjusted to 2 to 300 V. It is preferable to first increase the voltage at a constant current and to then maintain a constant voltage that is formation voltage. The chemical conversion time is preferably 30 to 960 minutes.

The current value at the endpoint of the chemical conversion is preferably $\frac{1}{20}$ or less of the initial current value in constant-voltage chemical conversion.

The capacitor element obtained by the above-described process is usually washed with pure water and then is dried. The drying is not particularly limited as long as it is carried out at a temperature for a time period sufficient for evaporating water adhering to the element. However, oxygen in the dielectric layer tends to diffuse if the temperature during the drying is higher than 120° C., which may disadvantageously affect the electric characteristics. Accordingly, the drying is preferably performed under conditions, for example, by holding the element at 105° C. for 30 minutes.

The capacitor element after the drying is subjected to wet evaluation to measure the electric characteristics. The electric characteristics can be measured in accordance with a method of testing tantalum sintered anodes for electrolytic capacitors (revised in February 2000) in Standards of Electronic Industries Association of Japan (EIAJ RC-2361A).

The method for manufacturing an electrolytic capacitor of the present invention includes preparing a capacitor element by the above-described process, forming a cathode on the dielectric layer of the capacitor element, electrically connecting the anode body and the cathode respectively to external terminal, and sealing them.

The cathode can be formed of a cathode material that is conventionally used for electrolytic capacitors. For example, a semiconductor layer can be formed of an inorganic semiconductor such as molybdenum dioxide, tungsten dioxide, lead dioxide, or manganese dioxide; or an organic semiconductor such as polypyrrole. Furthermore, a conductive layer can be formed of conductive paste such as carbon paste or silver paste or by metal plating.

The repair chemical conversion (chemical reconversion) may be performed during or after the formation of the semiconductor layer. The repair chemical conversion may be performed by a common process, but in order to suppress leakage current, the chemical conversion method of the present invention is preferably used. In particular, when the voltage desirable for the repair chemical conversion is a high voltage at which conventional chemical conversion cannot be performed, the method of the present invention is preferably used.

In addition, even if a dielectric layer is formed by a conventional process, the leakage current can be preferably suppressed by applying the chemical conversion method of the present invention to the repair chemical conversion.

The cathode is connected to a cathode lead in such a manner that electric communication can be performed, and the cathode lead is exposed to the outside of the exterior package of the electrolytic capacitor and serves as a cathode external terminal. On the other hand, the anode body is connected to an anode lead in such a manner that electric communication can be performed, and the anode lead is exposed to the outside of the exterior package of the electrolytic capacitor and serves as an anode external terminal. The cathode lead and the anode lead can be attached using common lead frame. Then, the exterior package is formed by sealing with, for example, a resin to obtain an electrolytic capacitor. The thus-produced electrolytic capacitor can be subjected to aging treatment, if necessary. The electrolytic capacitor of the present invention can be used by applying to various kinds of electric circuits or electronic circuits.

EXAMPLES

The present invention will be specifically described with reference to examples and comparative examples below, but is not limited to these examples.

Example 1

Niobium powder having an average primary particle diameter of 0.5 μm was prepared by ingot grinding, and polyisobutylmethacrylate dissolved in toluene was added to the niobium powder in an amount of 5% of the mass of the powder. The mixture was sufficiently stirred, followed by removal of toluene by evaporation. The obtained powder was molded with a tantalum powder molding machine, TAP-2R, manufactured by OPPC Co., Ltd., using a die of a 2.0 mm length and a 2.0 mm width together with a niobium wire having a diameter of 0.2 mm buried and implanted to obtain a powder molded product having an apparent green density of 3.0 g/cm$^3$ and a mass of 22 mg.

The powder molded product was sintered at 1230° C. for 30 minutes under a reduced pressure of 5×10$^{-4}$ Pa or less to produce a niobium sintered body. This sintered body had a CV value of 150000 μFV/g.

The niobium sintered body was immersed in an aqueous solution containing 3% by mass of phosphoric acid, 1% by mass of hydrogen peroxide and 25% by mass of ethylene glycol serving as a freezing point depressant, and the solution temperature was adjusted to −10° C. in a freezing equipment. The freezing point of a solution containing 4% by mass of phosphoric acid and 1.3% by mass of hydrogen peroxide, which is the same as the aqueous solution except that the freezing point depressant is not contained, was about −1.5° C. The chemical conversion was performed by, first, increasing the voltage at a constant current and then maintaining a constant formation voltage for 120 minutes (constant-voltage chemical conversion). The chemical conversion was performed at a current density of 1.5 A/g and a formation voltage of 20 V, 40 V, 60 V, or 100 V respectively. After the chemical conversion, washing with water and drying were conducted to obtain a capacitor element. Electric characteristic values of the resulting capacitor element were measured. Note that the leakage current is the measured value when a voltage of 0.7 times the formation voltage was applied. A 100-V conversion product was also measured for leakage current when a voltage of 25 V was applied. Table 1 shows the results.

Comparative Example 1

A niobium sintered body having a CV value of 150000 μFV/g obtained by the same process as in Example 1 was immersed in an aqueous solution containing 1% by mass of phosphoric acid, and the solution temperature was adjusted to 80° C. The chemical conversion was performed by first increasing the voltage at a constant current and then maintaining a constant formation voltage for 120 minutes. The chemical conversion was performed at a current density of 200 mA/g and a formation voltage of 20 V, 40 V, 60 V, or 100 V respectively. After the chemical conversion, washing with water and drying were conducted to obtain a capacitor element. Electric characteristic values of the resulting capacitor element were measured. Table 1 shows the results.

Comparative Example 2

A niobium sintered body having a CV value of 150000 μFV/g obtained by the same process as in Example 1 was immersed in an aqueous solution containing 1% by mass of nitric acid, and a capacitor element was prepared by the same process as in Comparative Example 1 except that the solution temperature was adjusted to 30° C. Electric characteristic values of the resulting capacitor element were measured. Table 1 shows the results.

TABLE 1

| | Electrolyte solution | Electrolyte solution temp. (° C.) | Formation voltage (V) | Initial applied current (mA) | Current at completion of formation (mA) |
|---|---|---|---|---|---|
| Example 1 | 3% Phosphoric acid | −10 | 20 | 33 | 0.043 |
| | 1% Hydrogen peroxide | −10 | 40 | 33 | 0.057 |
| | | −10 | 60 | 33 | 0.078 |
| | 25% Freezing point depressant | −10 | 100 | 33 | 0.215 |
| Comparative Example 1 | 1% Phosphoric acid | 80 | 20 | 4.4 | 0.020 |
| | | 80 | 40 | 4.4 | 0.027 |
| | | 80 | 60 | 4.4 | 0.062 |
| | | 80 | 100 | 4.4 | Not formed |
| Comparative Example 2 | 1% Nitric acid | 30 | 20 | 4.4 | 0.013 |
| | | 30 | 40 | 4.4 | 0.017 |
| | | 30 | 60 | 4.4 | 0.020 |
| | | 30 | 100 | 4.4 | Not formed |

TABLE 1-continued

|  | Electric capacitance (µF) | Leakage current before heating (µA) | | Leakage current after heating (µA) | Leakage current after heating/ Leakage current before heating |
| --- | --- | --- | --- | --- | --- |
|  |  | 0.7* formation voltage | 25 V measurement | 0.7* formation voltage | |
| Example 1 | 230 | 1.31 | — | 1.19 | 0.908 |
|  | 109 | 1.25 | — | 0.89 | 0.712 |
|  | 69 | 1.57 | — | 0.98 | 0.624 |
|  | 18 | 42.88 | 0.193 | 56.3 | 1.313 |
| Comparative Example 1 | 171 | 0.14 | — | 0.32 | 2.286 |
|  | 80 | 0.12 | — | 0.21 | 1.750 |
|  | 46 | 0.15 | — | 0.38 | 2.533 |
|  | — | — | — | — | — |
| Comparative Example 2 | 220 | 0.22 | — | 0.35 | 1.591 |
|  | 107 | 0.40 | — | 0.39 | 0.975 |
|  | 57 | 0.20 | — | 0.33 | 1.650 |
|  | — | — | — | — | — |

The capacitor elements of Example 1 and Comparative Examples 1 and 2 were subjected to heat treatment at 250° C. for 20 minutes. Changes in leakage current value by the heat treatment are shown in Table 1 and FIG. 1.

As shown in Table 1, in Comparative Examples 1 and 2, chemical conversion could not achieved at a voltage of 100 V, but in Example 1, chemical conversion at 100 V was possible. In 100-V conversion products, though the voltage for leakage current measurement is generally 70 V, the leakage current value is sufficiently low and does not cause any problem at a rated voltage, for example 25 V, determined from a formation voltage. The electric capacitance of the capacitor element of Example 1 was higher than that of the capacitor element of Comparative Example 1, and was sufficiently high compared with that of the capacitor element of Comparative Example 2 at the same formation voltage It was revealed from FIG. 1 that the capacitor element of Example 1 had a small change in leakage current compared to the capacitor elements of Comparative Examples 1 and 2, and was provided with thermally stable chemical conversion coating film.

Example 2

Commercially available niobium foil having a purity of 3 N and a thickness of 100 µm was cut into a piece of 10 mm×30 mm, and a niobium wire having a diameter of 0.2 mm was welded to a part of the short side of the piece. The piece was degreased with acetone, washed with nitric acid and then with water, and dried to obtain a niobium foil element.

Figure 6:
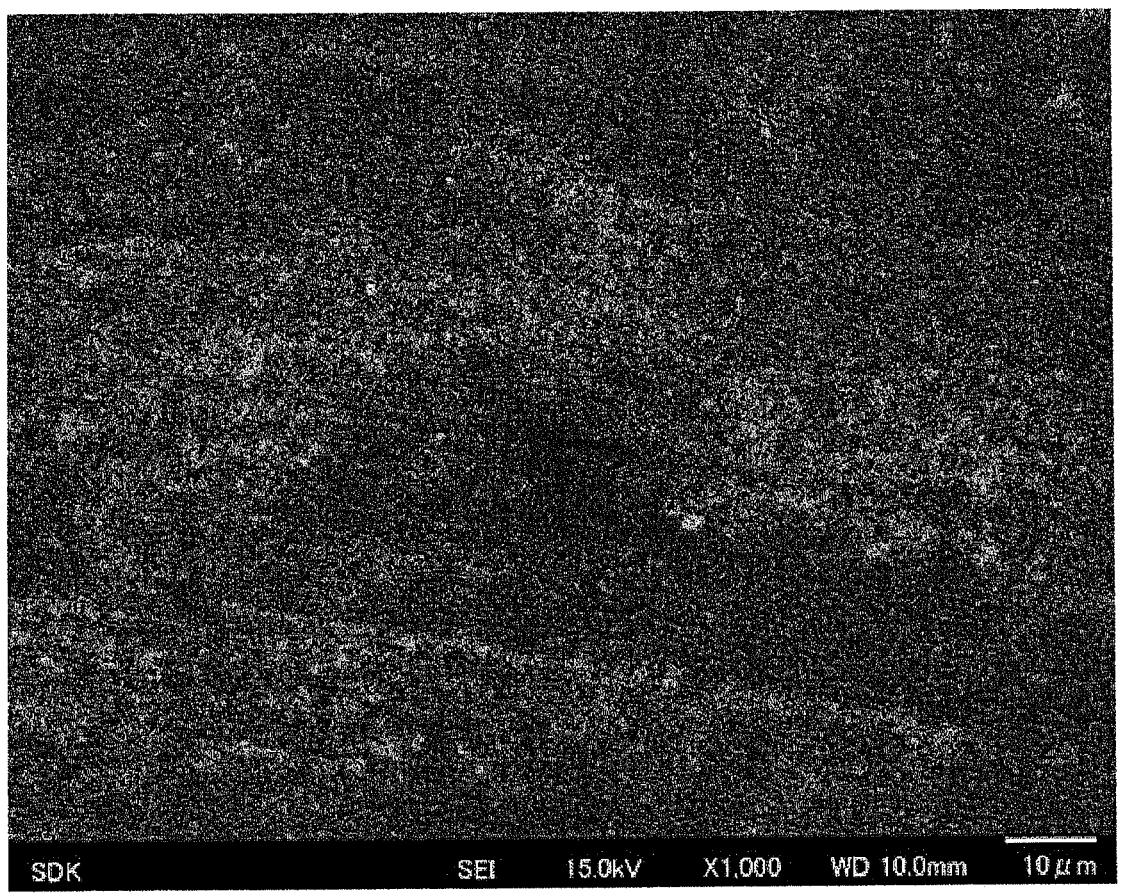
FIG. 6 is a scanning electron micrograph of the niobium foil surface chemically converted at 200 V in Example 2.
Figure 7:
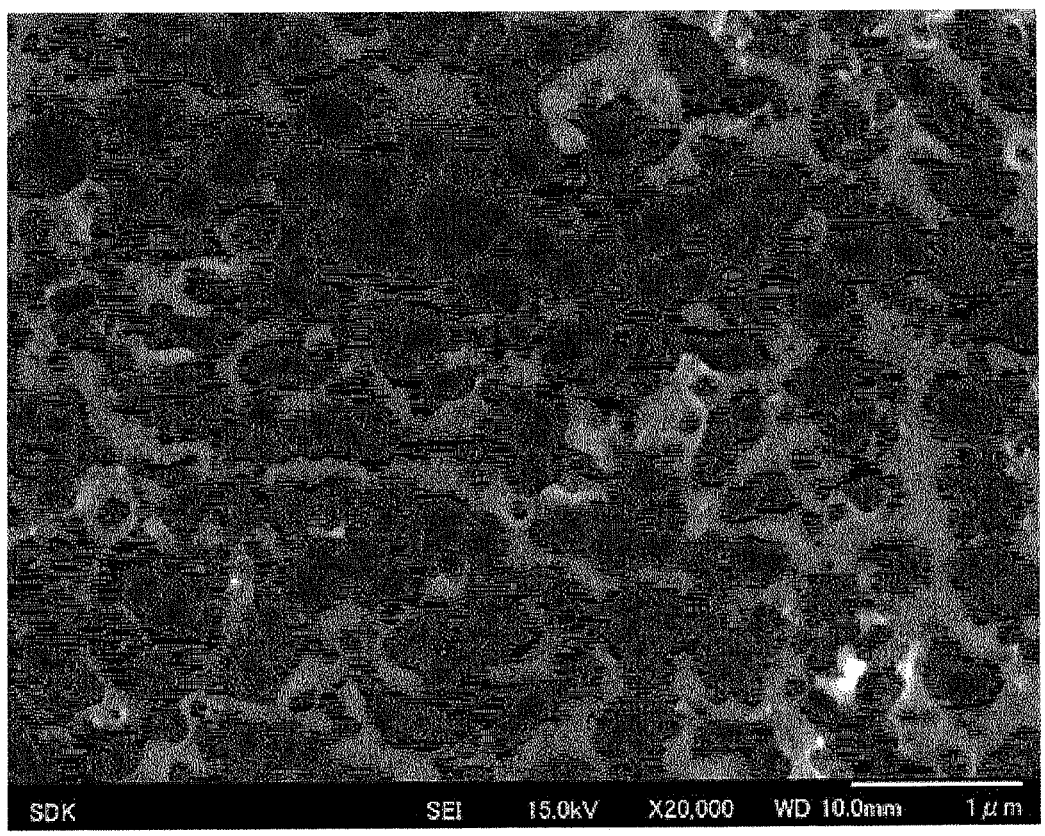
FIG. 7 is a scanning electron micrograph of the niobium foil surface chemically converted at 200 V in Example 2.

The niobium foil element was immersed in an aqueous solution containing 3% by mass of phosphoric acid, 1% by mass of hydrogen peroxide and 25% by mass of ethylene glycol serving as a freezing point depressant, and the solution temperature was adjusted to −10° C. in a freezing equipment. The chemical conversion was performed by, first, increasing the voltage at a constant current and then maintaining a constant formation voltage for 120 minutes, 360 minutes, 480 minutes, or 600 minutes respectively. The chemical conversion was performed at a current density of 5.5 mA/cm$^2$ or 0.83 mA/cm$^2$ and a formation voltage of 60 to 300 V respectively. After the chemical conversion, washing with water and drying were conducted to obtain a capacitor element. Electric characteristic values of the resulting capacitor element were measured. Table 2 shows the results. FIGS. 6 and 7 show scanning electron microscope (SEM) photographs of a niobium foil surface chemically converted at 200 V. FIG. 7 is a SEM photograph at a high magnification. As shown in FIGS. 6 and 7, the chemical conversion coating film had no defect in the field of view.

Comparative Example 3

Figure 8:
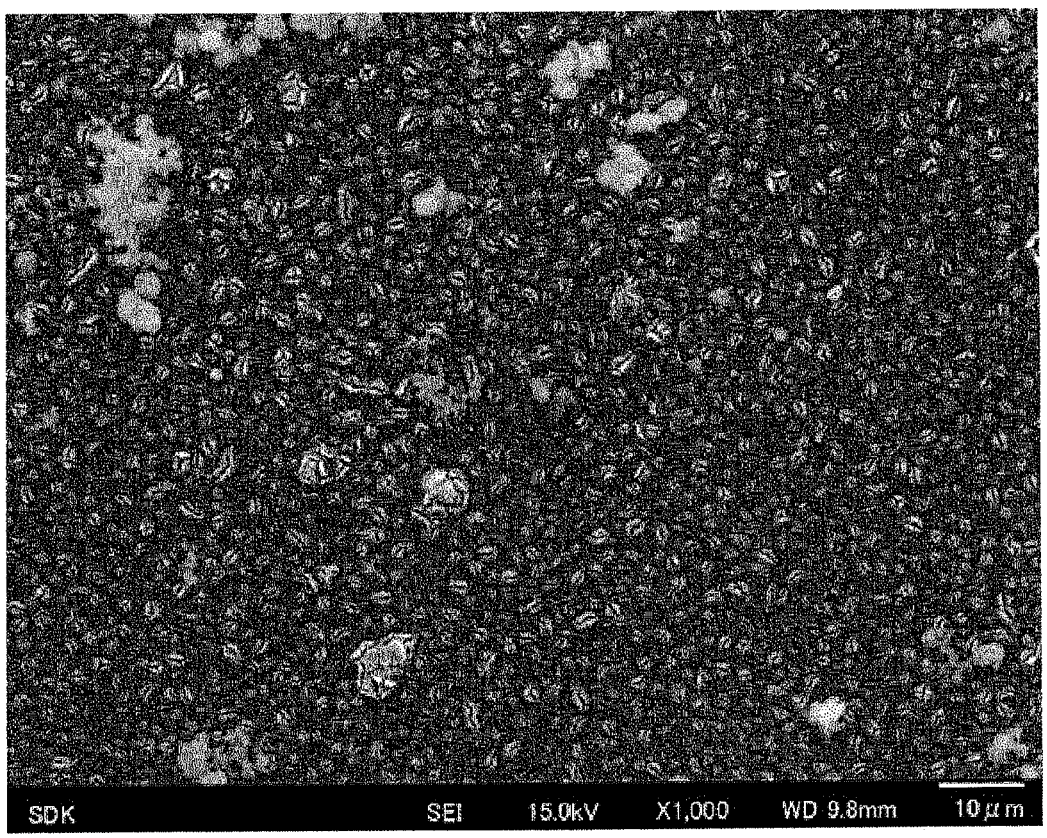
FIG. 8 is a scanning electron micrograph of the niobium foil surface chemically converted at 200 V for 600 minutes in Comparative Example 3.
Figure 9:
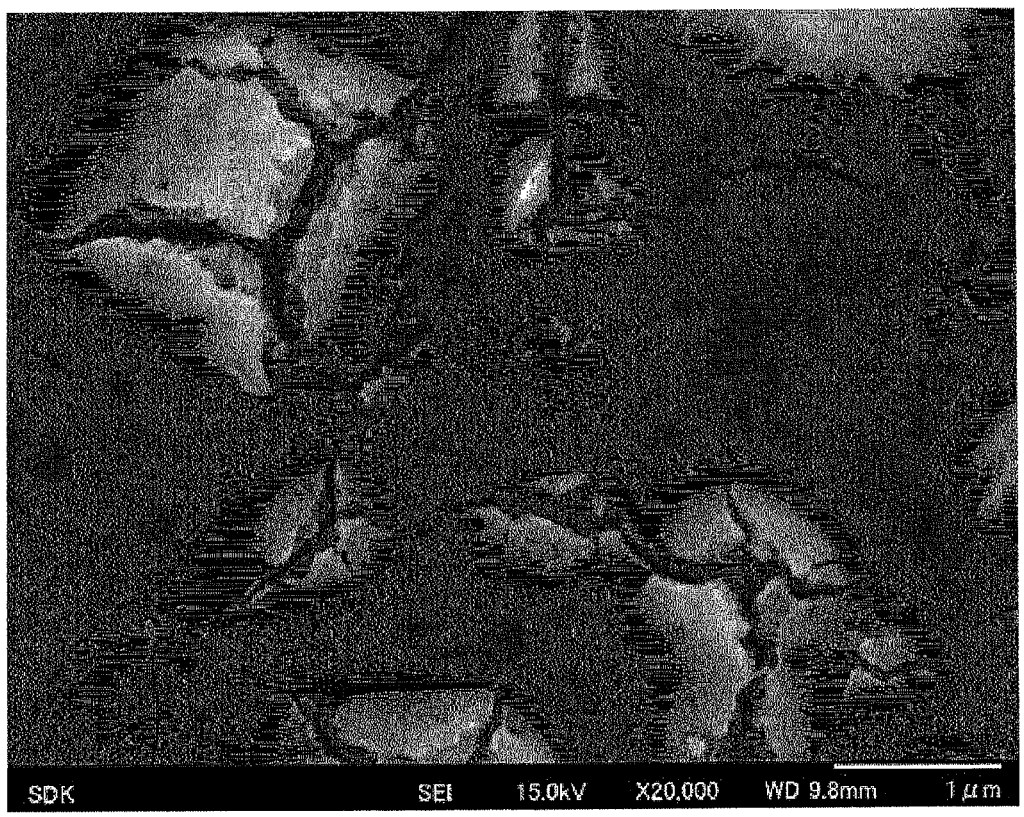
FIG. 9 is a scanning electron micrograph of the niobium foil surface chemically converted at 200 V for 600 minutes in Comparative Example 3.

A niobium foil element prepared by the same process as in Example 2 was immersed in an aqueous solution containing 1% by mass of phosphoric acid, and a capacitor element was produced by the same process as in Example 2 except that the solution temperature was adjusted to 70° C. or 60° C. Electric characteristic values of the resulting capacitor element were measured. Table 2 shows the results. FIGS. 8 and 9 show SEM photographs of a niobium foil surface chemically converted at 200 V for 600 minutes. FIG. 9 is a SEM photograph at a high magnification. As shown in FIG. 8, a granular pattern was observed in the entire field of view. As shown in FIG. 9, this granular pattern is a defect of the chemical conversion coating film. It was supposed that, due to this defect, in Comparative Example 3, the current at the completion of chemical conversion was not sufficiently decreased.

TABLE 2

|  | Electrolyte solution | Electrolyte solution temp. (° C.) | Formation voltage (V) | Initial applied current (mA) | Current at completion of formation (mA) | Formation time (min) | Electric capacitance (nF/cm$^2$) |
| --- | --- | --- | --- | --- | --- | --- | --- |
| Example 2 | 3% Phosphoric acid | −10 | 60 | 33 | 0.078 | 120 | 239 |
|  | 1% Hydrogen | −10 | 130 | 33 | 0.14 | 360 | 83 |
|  | peroxide | −10 | 200 | 33 | 0.56 | 480 | 61 |
|  | 25% Freezing point | −10 | 270 | 33 | 1.22 | 600 | 40 |
|  | depressant | −10 | 300 | 5 | 0.2 | 600 | 34 |

TABLE 2-continued

|  | Electrolyte solution | Electrolyte solution temp. (° C.) | Formation voltage (V) | Initial applied current (mA) | Current at completion of formation (mA) | Formation time (min) | Electric capacitance (nF/cm$^2$) |
|---|---|---|---|---|---|---|---|
| Comparative Example 3 | 1% Phosphoric acid | 70 | 60 | 33 | 1.100 | 120 | 164 |
|  |  | 70 | 130 | 33 | 0.027 | 360 | 62 |
|  |  | 70 | 200 | 33 | Not formed | — | — |
|  |  | 60 | 180 | 5 | 0.2 | 120 | 59 |
|  |  | 60 | 200 | 5 | 2.0 | 120 | 53 |
|  |  | 60 | 200 | 5 | 1.1 | 600 | 48 |
|  |  | 60 | 230 | 5 | Not formed | — | — |

It was confirmed from Table 2 that chemical conversion at 300 V or higher is possible by applying the present invention to niobium foil and that an element having a low CV value can accept high voltage. In addition, it is thought that the foil corresponds to a sintered body having a CV value of several hundred μFV/g.

Furthermore, it is confirmed from FIGS. 6 to 9 that chemical conversion coating films having a little defect as dielectric layers can be obtained by employing the present invention.

Example 3

Figure 2:
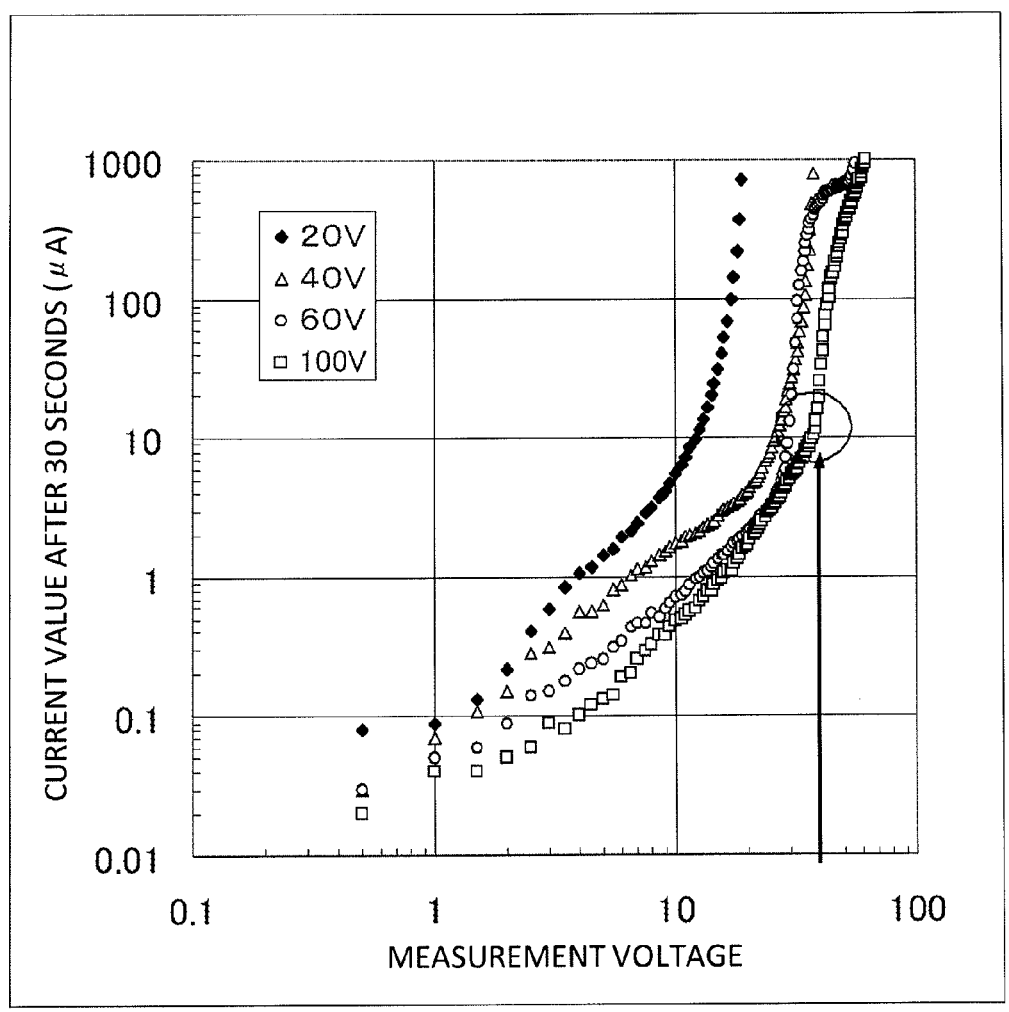
FIG. 2 is a graph showing current-voltage characteristics of a capacitor element obtained by the manufacture method in the present invention.

The capacitor element produced in Example 1, which was used as an anode, and platinum black, which was used as a cathode, were immersed in a 40% by mass sulfuric acid solution at room temperature, and a direct-current power supply was connected to the anode and the cathode in the forward direction. A direct current was applied between the anode and the cathode at a current of 10 mA and a voltage of 0.5 V, and the current value was measured after a lapse of 30 seconds from the start of the current application. The direct-current power source was switched off once, and a direct current was applied again at 1.0 V, which was higher than the voltage formerly applied by 0.5 V, and the current value was measured after a lapse of 30 seconds from the start of the current re-application. Similarly, the current values were measured on each time the voltage was increased by 0.5 V. FIG. 2 shows a relationship between the applied voltage values and the current values after a lapse of 30 seconds.

FIG. 2 shows data of the capacitor element produced in Example 1. It was confirmed that a 100-V chemical conversion product had an inflection point shown by a circle at about 40 V. That is, in the region having a voltage of not higher than the inflection point, the current-voltage characteristics are reversible and conform to Ohm's law, and when the capacitor element is applied to an electrolytic capacitor, a rated voltage of not higher than this inflection point can be selected.

Comparative Example 4

Figure 3:
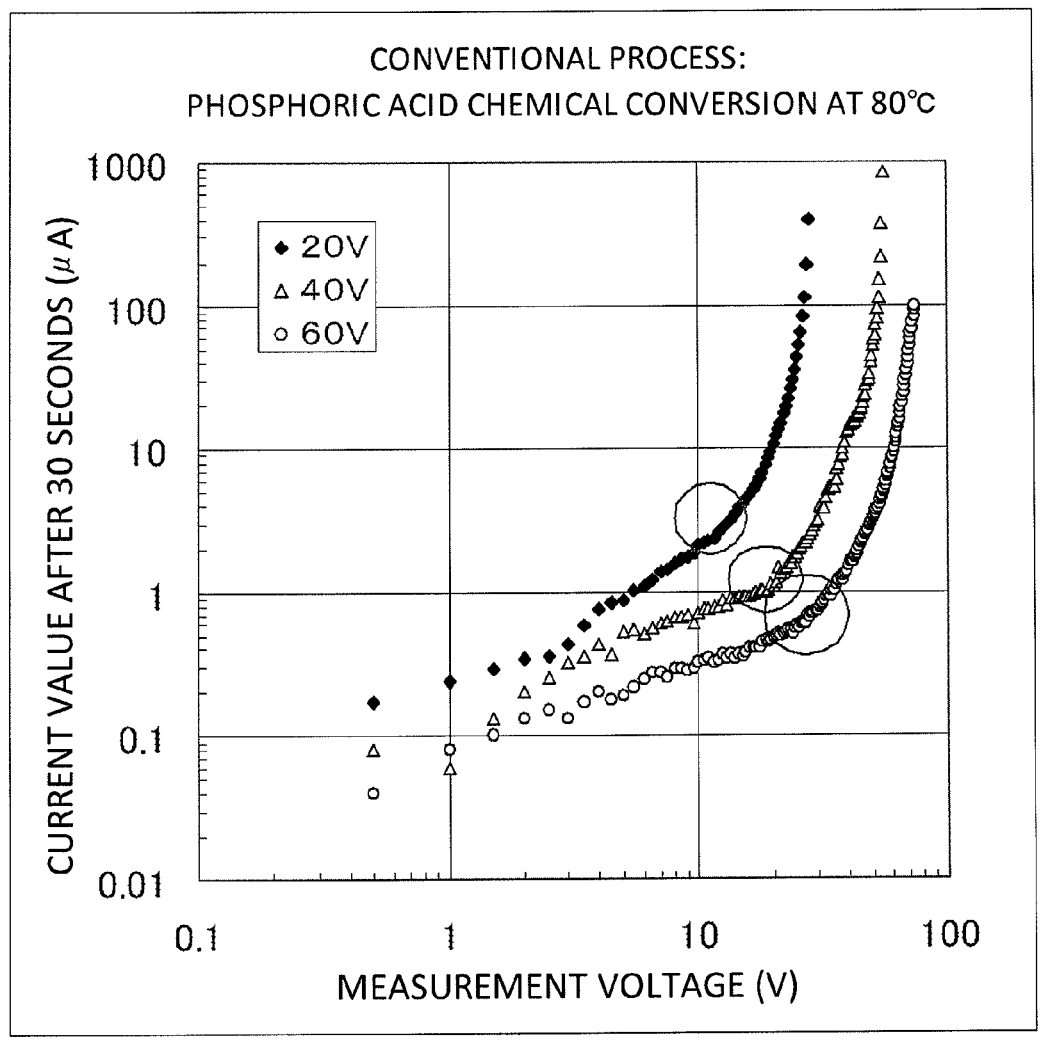
FIG. 3 is a graph showing current-voltage characteristics of a capacitor element obtained by a conventional process.

Measurement was conducted by the same process as in Example 3 except that the capacitor element produced in Comparative Example 1 was used as the anode. FIG. 3 shows the results.

As shown in FIG. 3, in the capacitor element of Comparative Example 1, the voltage value of the inflection point shown by a circle was as low as about 30 V and does not come up to that of the conversion product of Example 1, even in the 60-V chemical conversion product.

Comparative Example 5

Figure 4:
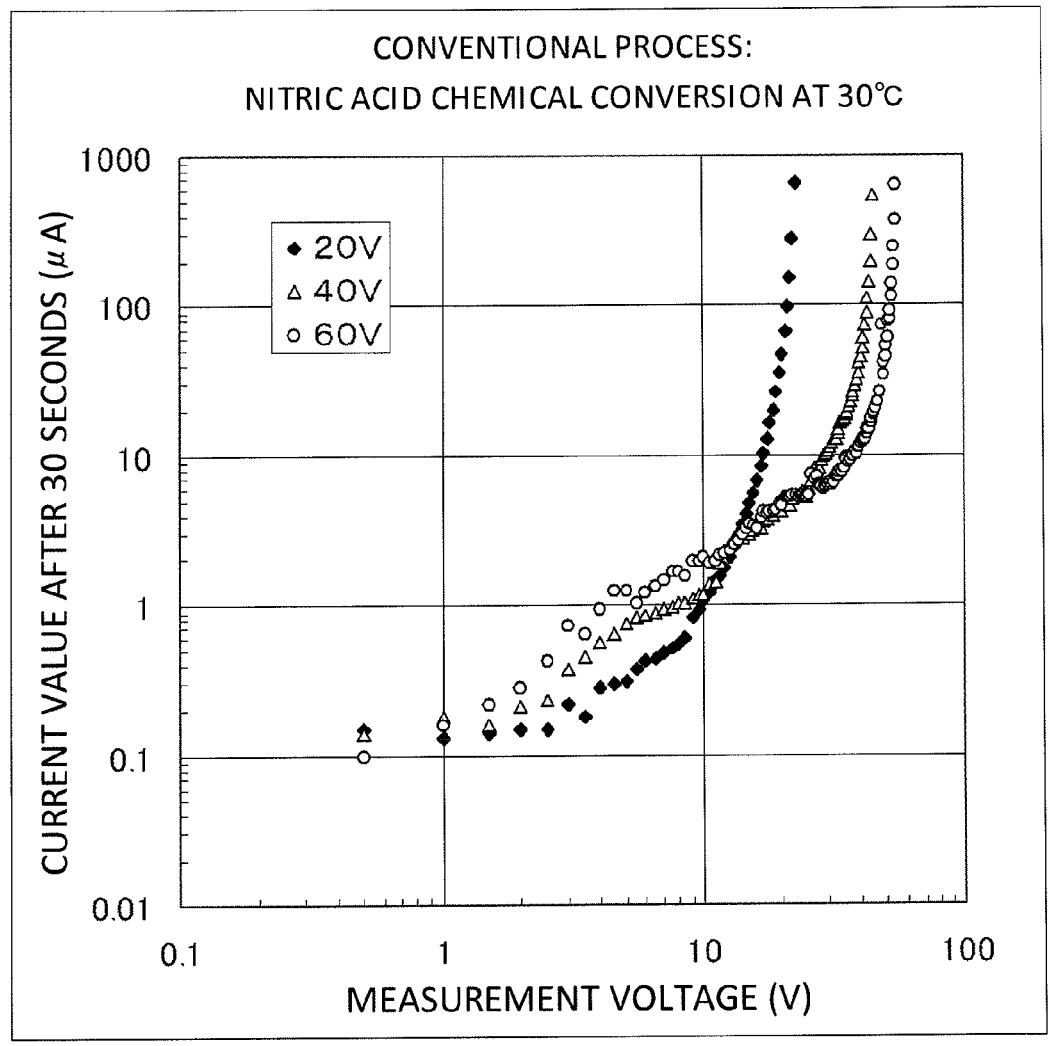
FIG. 4 is a graph showing current-voltage characteristics of a capacitor element obtained by a conventional process.

Measurement was conducted by the same process as in Example 3 except that the capacitor element produced in Comparative Example 2 was used as the anode. FIG. 4 shows the results.

It was confirmed from FIG. 4 that since data of the 40-V chemical conversion product and the 60-V chemical conversion product showed current values larger than that of the 20-V chemical conversion product from the start, inflection point apparently appears at around 30 V, but the electric characteristics were inferior.

Example 4

Niobium sintered bodies having CV values shown in Table 3 were prepared by the same process as in Example 1 using niobium powder prepared by ingot grinding in such a manner that the average primary particle diameter calculated from the BET surface area is 0.3 μm to 1 μm.

Chemical conversion was performed by the same process as in Example 1 using the above sintered bodies. The chemical conversion was performed at various voltages, and the upper threshold of the formation voltage, that was defined as threshold formation voltage, at which the current value at the end point of the chemical conversion was 1/20 or less of the initial current value in constant-voltage chemical conversion was determined. Table 3 shows the measurement results.

Comparative Example 6

Chemical conversion was performed by the same process as in Example 4 using a sintered body prepared by the same process as in Example 4, and threshold formation voltage was determined. In the chemical conversion, an aqueous solution containing 1% by mass of phosphoric acid was used as the chemical conversion solution, and the temperature of the chemical conversion solution was adjusted to 60° C. Table 3 shows the measurement results.

Figure 5:
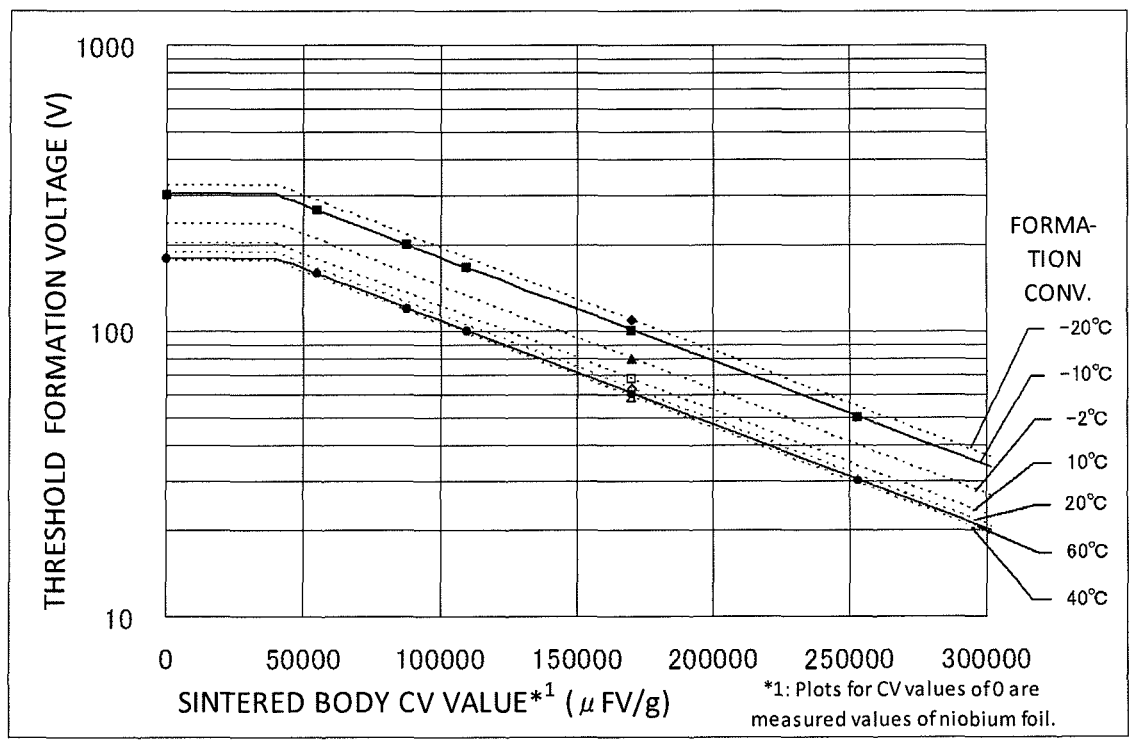
FIG. 5 is a graph showing formation temperatures and threshold formation voltages for CV values.

The relationship between the threshold formation voltage and CV value in Example 4 and Comparative Example 6 shows a good exponential approximation in a region in which the CV value is higher than 40000 μFV/g, as shown by solid lines in FIG. 5, to give a relationship of Equation 1. The constants A and B in Equation 1 of the exponential approximation determined from measured values are shown in Table 3.

Threshold formation voltage [V]=$A \times \exp(B \times CV$ value [μFV/g]) (Equation 1)

In Equation 1, A and B are constants, and CV value>40000 μFV/g.

Note that the threshold formation voltage in the region in which the CV value is 40000 μFV/g or less is a constant voltage that is hardly affected by the CV value.

TABLE 3

| CV value (μFV/g) | | Example 4 Formation temp. -10° C. | Comparative Example 6 Formation temp. 60° C. |
|---|---|---|---|
| 55000 | Threshold | 266 | 160 |
| 88000 | formation | 200 | 120 |
| 110000 | voltage | 167 | 100 |
| 170000 | (V) | 100 | 60 |
| 253000 | | 50 | 30 |
| A value | | 421 | 253 |
| B value | | $-8.4 \times 10^{-6}$ | $-8.4 \times 10^{-6}$ |

Example 5

Chemical conversion was conducted by the same process as in Example 4, using a sintered body of 170000 μFV/g prepared by the same process as in Example 4 except that the temperature of the chemical conversion solution was set to -2° C. Table 4 shows the results.

Example 6

Chemical conversion was conducted by the same process as in Example 4, using a sintered body of 170000 μFV/g prepared by the same process as in Example 4 except that an aqueous solution containing 5.6% by mass of phosphoric acid, 1.9% by mass of hydrogen peroxide, and 28% by mass of ethanol was used as the chemical conversion solution, and the temperature of the chemical conversion solution was set to -20° C. Table 4 shows the results.

Comparative Example 7

Chemical conversion was conducted by the same process as in Comparative Example 6, using a sintered body of 170000 μFV/g prepared by the same process as in Example 4 except that the chemical conversion solution temperature was 10° C., 20° C., 30° C., or 40° C. respectively. Table 4 shows the results.

TABLE 4

| | Formation temp. | Threshold formation voltage (V) | A value |
|---|---|---|---|
| Example 6 | -20° C. | 109 | 455 |
| Example 4 | -10° C. | 100 | 421 |
| Example 5 | -2° C. | 80 | 334 |
| | 10° C. | 68 | 284 |
| Comparative Example 7 | 20° C. | 63 | 263 |
| | 30° C. | 62 | 259 |
| | 40° C. | 59 | 246 |
| Comparative Example 6 | 60° C. | 60 | 253 |

CV value: 170000 μFV/g
B value: $-8.4 \times 10^{-6}$

It was confirmed by Example 4 and Comparative Example 6 that, in the exponential approximation, the constant A value depended on the formation temperature whereas the constant B value was constant without depending on the formation temperature. Therefore, if the threshold formation voltage at specific formation temperature and CV value is determined, a constant A can be determined from the threshold formation voltage, and the threshold formation voltage at the formation temperature for each CV value can be estimated. The A value at each formation temperature is shown in Table 4. The threshold formation voltage at each formation temperature and CV value is shown by dotted lines in FIG. 5.

As shown in FIG. 5, in the conventional process, when the CV value is 40000 μFV/g or less, the threshold formation voltage is less than 203 V. In a CV value larger than 40000 μFV/g, the threshold formation voltage is in the range in which the A value in Equation 1 is smaller than 285.

On the other hand, in the method of the present invention, chemical conversion can be performed at 210 V or higher, preferably at 230 V or higher, when the CV value is 40000 μFV/g or less. In a CV value larger than 40000 μFV/g, chemical conversion can be performed at a formation voltage not less than that when the constant a is 294 in the following Equation 2, preferably a formation voltage not less than that when the constant a is 322.

Formation voltage [V]=$a \times \exp(b \times CV$ value [μFV/g])  (Equation 2)

In Equation 2, a and b are constants, b=$-8.4 \times 10^{-6}$, and CV value>40000 μFV/g.

Example 7

A capacitor element was obtained by chemical conversion at 40 V through the same process as in Comparative Example 1. The obtained element was immersed in an aqueous solution containing 60% by mass of manganese nitrate, and then thermal decomposition of manganese nitrate adhering to the element was repeated 10 times at 220° C. to form a manganese dioxide layer, an inorganic semiconductor layer, on the element.

This element was chemically converted by the same process as the chemical conversion of the niobium sintered body in Example 1 except that the current density was 1.5 A/g, the formation voltage was 30 V, and the holding time was 30 minutes to perform repair chemical conversion. After the repair chemical conversion, a carbon layer and silver paste layer were sequentially laminated on the element. The element was placed on a lead frame, and the entire was sealed with an epoxy resin to produce a chip-type capacitor. The obtained capacitor had a capacitance of 71 μF and a leakage current of 21 μA.

Comparative Example 8

A capacitor element was produced by chemical conversion at 40 V through the same process as in Comparative Example 1. The obtained element was immersed in an aqueous solution containing 60% by mass of manganese nitrate, and then thermal decomposition of manganese nitrate adhering to the element was repeated 10 times at 220° C. to form a manganese dioxide layer, which is an inorganic semiconductor layer, on the element.

This element was chemically converted by the same process as the chemical conversion of the niobium sintered body in Comparative Example 1 except that the current density was 200 mA/g, the formation voltage was 30 V, and the holding time was 30 minutes to perform repair chemical conversion. After the repair chemical conversion, a chip-type capacitor was produced by the same process as in Example 7, and electric characteristics were measured. The obtained capacitor had a capacitance of 70 μF and a leakage current of 35 μA.

Note that the leakage currents in Example 7 and Comparative Example 8 were current values measured after a lapse of 30 seconds from the start of direct current application at a current of 10 mA and a voltage of 10 V.

The leakage current of the capacitor produced in Example 7 is less than that of the capacitor produced in Comparative Example 8. That is, it has been confirmed that the leakage current of a capacitor can be reduced by repairing the dielectric layer, which is formed by a conventional chemical conversion process, by the process according to the present invention.

The invention claimed is:

1. A method for manufacturing a capacitor element comprising:
   chemically converting an anode body composed of a niobium or niobium alloy in a first electrolyte solution to form a dielectric layer in a surface of the anode body or to repair a dielectric layer formed in a surface of the anode body, in which the first electrolyte solution comprises an oxygen supply agent, a freezing point depressant, an electrolyte and a solvent, and a temperature of the first electrolyte solution is lower than the freezing point of a second electrolyte solution, in which the second electrolyte solution is the same as the first electrolyte solution except that the freezing point depressant is not contained in the second electrolyte solution.

2. A method for manufacturing a capacitor element comprising:
   chemically converting an anode body composed of a niobium or niobium alloy to form a dielectric layer in a surface of the anode body,
   forming a semiconductor layer on the dielectric layer; and
   conducting a chemical conversion in a first electrolyte solution to repair the dielectric layer during or after the formation of the semiconductor layer, in which the first electrolyte solution comprises an oxygen supply agent, a freezing point depressant, an electrolyte and a solvent, and a temperature of the first electrolyte solution is lower than the freezing point of a second electrolyte solution, in which the second electrolyte solution is the same as the first electrolyte solution except that the freezing point depressant is not contained in the second electrolyte solution.

3. The method for manufacturing a capacitor element according to claim 1, wherein the oxygen supply agent is hydrogen peroxide or ozone.

4. The method for manufacturing a capacitor element according to claim 1, wherein the freezing point depressant is alcohol.

5. The method for manufacturing a capacitor element according to claim 4, wherein the alcohol is at least one compound selected from the group consisting of methanol, ethanol, ethylene glycol, glycerin, 1-propanol, 2-propanol, and butanol.

6. The method for manufacturing a capacitor element according to claim 1, wherein the electrolyte is phosphoric acid, sulfuric acid, nitric acid, boric acid, acetic acid, adipic acid, or a salt of any of these acids; and
   wherein the solvent is water.

7. The method for manufacturing a capacitor element according to claim 1, wherein the first electrolyte solution is not a supersaturated solution during the chemical conversion.

8. The method for manufacturing a capacitor element according to claim 1, wherein the anode body is a sintered body or foil.

9. The method for manufacturing a capacitor element according to claim 1, wherein the anode body is a porous material.

10. The method for manufacturing a capacitor element according to claim 1, wherein the formation voltage is 210 V or higher, and the CV value of the anode body is 40000 CV/g or less.

11. The method for manufacturing a capacitor element according to claim 1, wherein the formation voltage is $294 \times \exp(-8.4 \times 10^{-6} \times CV$ value [µFV/g] of the anode body) [V] or higher, and the CV value of the anode body is larger than 40000 CV/g.

12. The method for manufacturing a capacitor element according to claim 1, wherein the current value at the end point of chemical conversion is 1/20 or less of the initial current value in constant-voltage chemical conversion.

13. A method for manufacturing an electrolytic capacitor comprising:
   preparing a capacitor element having a dielectric layer produced by the method according to claim 1,
   forming a cathode on the dielectric layer of the capacitor element,
   electrically connecting the anode body and the cathode respectively to external terminals, and sealing them.

* * * * *